April 18, 1933.   C. S. SMITH   1,904,389
BRAZING SOLDER
Filed July 30, 1932

MELTING POINTS OF THE COPPER-PHOSPHORUS-SILICON ALLOYS.

THE MECHANICAL PROPERTIES OF SOLDERED JOINTS MADE WITH
Cu-Si-P ALLOYS OF EUTECTIC COMPOSITION.

Inventor
Cyril Stanley Smith
By Wooster & Davis
Attorneys

Patented Apr. 18, 1933

1,904,389

UNITED STATES PATENT OFFICE

CYRIL STANLEY SMITH, OF CHESHIRE, CONNECTICUT, ASSIGNOR TO THE AMERICAN BRASS COMPANY, OF WATERBURY, CONNECTICUT, A CORPORATION OF CONNECTICUT

BRAZING SOLDER

Application filed July 30, 1932. Serial No. 626,524.

This invention relates to brazing solders, and has for an object to provide an alloy for use as a welding rod or brazing solder which has a comparatively low melting point and at the same time produces stronger and less brittle joints than are obtainable with other solders of similar melting point.

I have found that copper, phosphorus, and silicon in suitable proportions make an alloy of desirable properties, particularly for welding non-ferrous alloys. The copper-phosphorus alloys are already established and finding considerable application in industry. The addition of silicon raises the melting point of the binary copper-phosphorus alloys very slightly but simultaneously increases the fluidity and wetting powers of the alloy. The major effect of the silicon addition, however, is in the superior mechanical properties of the joints obtained, particularly in regard to the impact resistance.

Figure 1:
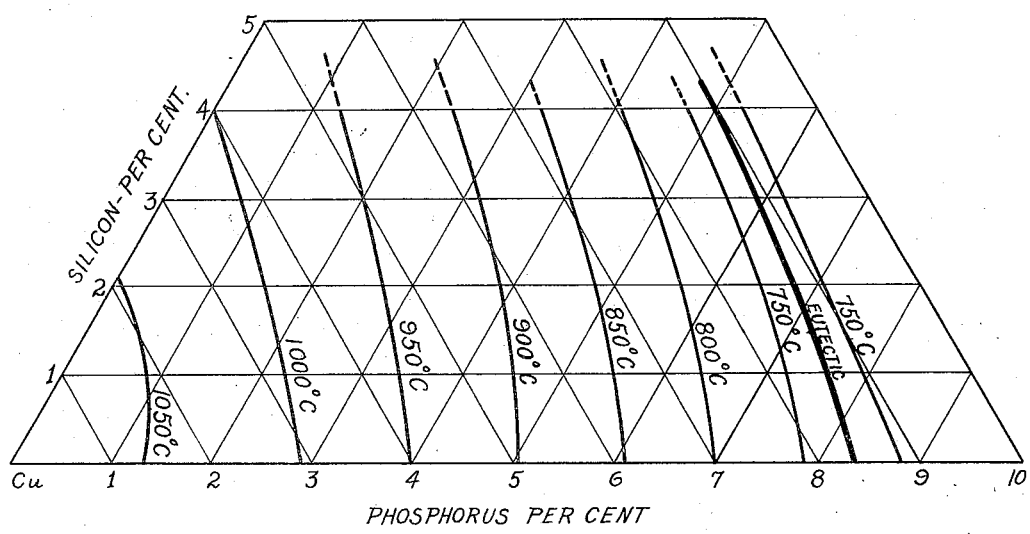
Figure 2:
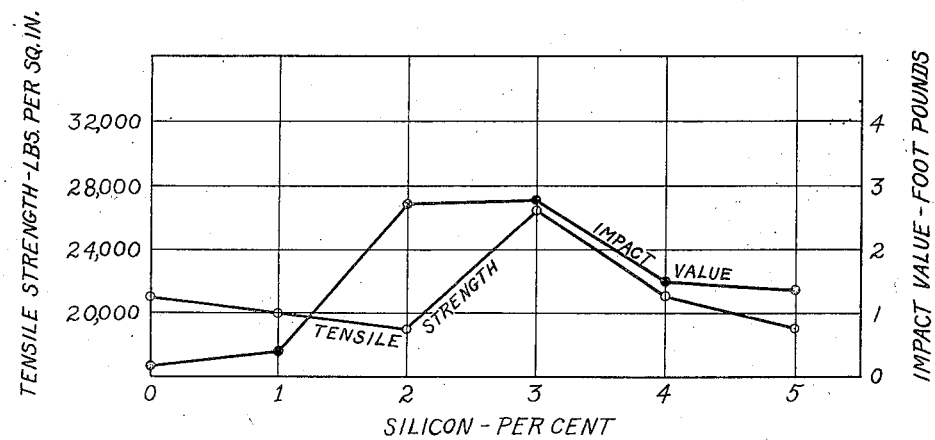

In my researches I have found the melting points of copper-phosphorus-silicon alloys to be approximately as shown by the insothermals in Figure 1 of the accompanying drawing. The alloys of lowest melting point for a given silicon content are represented by the eutectic line in the diagram, Fig. 1. The temperature of the eutectic is raised from 714° C. for the binary copper-phosphorus alloys to 730° C. with 1.5 percent silicon and remains at practically 730° C. with additions up to at least 4 percent silicon. The impact resistance and tensile strength of butt joints between brass rod 0.23" diameter were found to be as shown in Figure 2, the impact and tensile strengths are both much higher with 3 percent silicon, although with further additions of silicon they decrease.

While alloys of eutectic composition have the lowest melting point and the greatest fluidity for a given amount of silicon, it is often advantageous to employ alloys removed from this line, the presence of excess copper rendering the alloys stronger and more ductile, while excess phosphorus is desirable in alloys liable to be oxidized during melting. Although any of the alloys containing less than 7 percent silicon and 10 percent phosphorus make satisfactory solders, the melting point becomes sufficiently low to be of practical importance only in the following range: phosphorus 2 to 10 percent, silicon 0.1 to 5 percent, copper balance; and of these the alloys most desirable from the standpoint of melting point alone are those approximating in composition to the eutectic line in Figure 1. The preferred composition is approximately 90.5 percent to 93 percent copper, 0.1 percent to 4 percent silicon and the remainder principally phosphorus.

The alloy may be employed in the form of cast or worked rods or in the granulated condition, and while the use of a flux is not necessary if the surfaces to be joined are perfectly clean it is always advantageous. Borax, for example, has been found to be a suitable flux although other fluxes may be used.

On account of the high fluidity and low melting point, the alloys are suitable for die castings or permanent mold castings where accuracy of finish is desired and very high ductility is not of importance.

Having thus set forth the nature of my invention, what I claim is:

1. An alloy containing approximately 2 to 10 percent of phosphorus, 0.1 to 5 percent of silicon, the balance being substantially all copper.

2. An alloy containing about 3 percent silicon, 6 percent phosphorus, and the balance being substantially all copper.

3. An alloy comprising approximately 90.5 percent to 93 percent copper, 0.1 percent to 4 percent silicon, and the remainder substantially all phosphorus.

In testimony whereof I affix my signature.

CYRIL STANLEY SMITH.